United States Patent Office 3,206,417
Patented Sept. 14, 1965

3,206,417
PROCESS OF ACCELERATING THE VULCANIZATION OF FOAM RUBBER LATEX USING WATER-SOLUBLE ALKYL AMMONIUM ALKYLDITHIOCARBAMATES AS A VULCANIZATION ACCELERATOR
Raymond R. Waterman, Easton, Donald C. Morris, Norwalk, and Lester A. Brooks, East Norwalk, Conn., assignors to R. T. Vanderbilt Company, Inc., New York, N.Y., a corporation of New York
No Drawing. Filed Oct. 3, 1961, Ser. No. 142,542
10 Claims. (Cl. 260—2.5)

The present invention relates to foam rubber, and more particularly to a process for accelerating the vulcanization of foam rubber latex without upsetting the gelation thereof by using water-soluble alkyl substituted ammonium salts of dialkyldithiocarbamic acids as accelerators.

Foam rubber, as distinguished from sponge rubber which is prepared by chemically blowing dry or coagulated rubber, is built around a soap froth in latex. In the commonly used Dunlop process, compounded latex is frothed by high speed mixing with air. Zinc oxide dispersion and sodium fluosilicate or other gelling agent is added to the froth just before the foam is poured into the mold. The zinc oxide activates the cure and also facilitates the gelation process. The sodium fluosilicate slowly hydrolyzes to liberate hydrogen fluoride and silicic acid according to the equation:

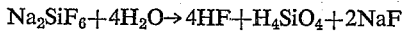

$$Na_2SiF_6 + 4H_2O \rightarrow 4HF + H_4SiO_4 + 2NaF$$

The silicic acid causes coagulation of the rubber in the froth and thus traps air in the cells of a closed system. As the pH continues to drop, open systems of connecting cells are formed when the soap bubbles break.

As soon as gelation is complete, in about six to ten minutes, the wet foam is placed in a steam vulcanizer and partially cured with steam (212° F.) at atmospheric pressure. The partially cured foam is then washed thoroughly in water to free it from impurities and thus improve its ageing properties and reduce its odor. The final sulfur cure is accelerated by ultra accelerators and takes place when the wet foam is dried between 140° F. 260° F.

The latex is compounded by adding thereto the vulcanizing agent, accelerators, antioxidants, and foam stabilizers (secondary gelling agents) necessary to produce a satisfactory vulcanizate, and also the soap necessary to produce the froth, unless the soap is already present in the latex as furnished by the supplier. A typical styrene-butadiene (SBR) formulation, for example, contains the following ingredients, all calculated on a dry basis: 100 parts styrene-butadiene rubber, 2 parts sulfur (vulcanizing agent), 1 part soap (frothing agent), 2 parts of an accelerator system (usually 1 part zinc diethyldithiocarbamate and 1 part zinc salt of 2-mercaptobenzothiazole), 1 part antioxidant and 1 part of foam stabilizer (secondary gelling agent). All of these compounding agents are added as emulsions, aqueous solutions or dispersions to the stabilized latex in order to obtain intimate mixing without upsetting the colloidal system. The sulfur is usually added as a dispersion, the soap as an emulsion, the accelerators as dispersions, and the antioxidants as dispersions or emulsions according to their nature. A foam stabilizer (secondary gelling agent), such as Trimene Base (ethyl chloride-formaldehyde-ammonia reaction product), is used to minimize foam collapse.

After thorough mixing and frothing, as in the Oakes continuous foamer, 5 parts of zinc oxide as a dispersion is added to activate the cure and assist gelation. Finally, enough sodium silicofluoride is added to gel the foam in a reasonable length of time. For continuous processes, gelling should be completed soon after the molds are filled but before drainage of the liquid latex produces nonuniform foam structure. This period normally amounts to six to ten minutes after addition of the gelling agent. The process must be balanced so that gelation is complete before the soap is destroyed by the drop in pH resulting from hydrolysis of the silicofluoride and consequent collapse of the foam.

It is apparent that each addition of a compounding agent in emulsion or dispersion form dilutes the rubber solids content of the compounded latex. The dilution factor is very important, especially with SBR latex, for there must be enough rubber present surrounding each soap bubble to form a gel structure strong enough to resist collapse when the soap is destroyed by the drop in pH. The wet gel strength of SBR foam is markedly lower than that of natural rubber foam. Whereas natural rubber foams containing as low as 55% solids are strong enough when first gelled so that the tiny fibrils cohere and actually pull away (shrink) from the mold rather than collapsing during cure, an SBR foam with the same solids content will rupture internally and collapse. The solids content of the SBR must be maintained above 62%.

Ultra accelerators are used to obtain fast enough cure to render steam cured foam strong enough to prevent permanent deformation in the washing process, and they promote rapid vulcanization of the foam by dry heat.

The dithiocarbamates used as ultra accelerators in dry rubber are difficult to use in latex, because they are water-insoluble and must be dispersed in extremely fine form before addition to the latex. It requires twenty-four to forty-four hours' pebble-mill grinding with water and surface active dispersing agents to prepare satisfactory dispersions from the solids. Formerly, compounders had to prepare their own dispersions; more recently, dispersions have been offered by suppliers. The long grinding is wasteful of both time and power. It would be much more satisfactory if water-soluble dithiocarbamates could be used.

Alkali metal salts of dialkyldithiocarbamic acids are water-soluble, and it is possible to prepare them in high enough concentration so they do not dilute the latex unduly. However, they are not satisfactory because they interfere with gelation giving increased gel time, weak gels and coarse nonuniform foams. The trialkanolammonium salts of dialkyldithiocarbamic acids, the trialkylammonium salts of dialkanoldithiocarbamic acids, and the monoalkylammonium salts of monoalkyldithiocarbamic acids are also water-soluble, but the foam rubbers produced therewith are commercially unsatisfactory because of inadequate processing characteristics.

It is an object of this invention, therefore, to provide a process for accelerating the vulcanization of foam rubber using water-soluble dithiocarbamate accelerators which will not unduly dilute the latex formulation and cause collapse of the foam. It is a further object to provide such a process using accelerators which will not interfere with the gelation of the foam. A still further object is to provide such a process using accelerators which, while water-soluble, will not be washed out during and after steam cure of the gelled foam.

These objects are satisfied by the present invention which provides a process for accelerating the vulcanization of foam rubber latex by incorporating into a vulcanizable, i.e., compounded, foam rubber latex (as described above and hereinafter) prior to frothing, gelling and curing from about 1 part to about 2.5 parts per 100 parts of rubber on a dry weight basis of at least one water-soluble vulcanization accelerator having the formula

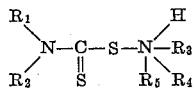

where $R_1$, $R_2$, $R_3$, $R_4$ are normal alkyl radicals having from 1 to 4 carbon atoms and $R_5$ is hydrogen or a normal alkyl radical having from 1 to 4 carbon atoms. Exemplary accelerators include diethylammonium diethyldithiocarbamate, triethylammonium dimethyldithiocarbamate, trimethylammonium dimethyldithiocarbamate, triethylammonium dibutyldithiocarbamate, trimethylammonium diethyldithiocarbamate and physically or chemically prepared blends thereof. These accelerators can be used alone or in combination with other accelerators, such as zinc 2-mercaptobenzothiazole.

The process is applicable to compounded or vulcanizable natural (Hevea) rubber, styrene-butadiene rubber and acrylonitrile-butadiene rubber latices and blends thereof, but has not been found applicable to neoprene (chloroprene) polymer latices.

The process is further illustrated by the following examples.

EXAMPLE 1

To 100 parts (calculating all ingredients on the dry basis) of 69% SBR latex (Pliolite 5352 of Goodyear Chemical Division which is a large particle size, 70% butadiene–30% styrene copolymer containing soap) there was added 2 parts of sulfur in 50% dispersion (vulcanizing agent), 1 part of a 65% dispersion of zinc 2-mercaptobenzothiazole (accelerator), 1 part of commercial antioxidant (65% Agerite Superlite Emulsion, a mixture of polyalkylated bis-phenol A derivatives), and 1 part Trimene Base foam stabilizer (50% aqueous solution of ethyl chloride-formaldehyde-ammonia reaction product), and to separate portions of this base compound, 1 part of dithiocarbamate accelerator. The compound was mixed at 73° F. in a Hobart C-100, 3-quart mixer equipped with a wire whip for 4 minutes at speed 3 and for 1 minute at speed 2. Then five parts of zinc oxide (activator) were added as a 65% dispersion and mixed for 1 minute at speed 2. Three parts of sodium silicofluoride (gelling agent) were added as a 30% dispersion and mixing was continued for 30 seconds at speed 2 and for an additional 30 seconds at speed 1. The latex, the room, and the mold temperatures were all 73° F. The foam was poured into cure test molds where it gelled. The foam was cured in open steam at 212° F. for 20 minutes, then dried at 73° F. and 50% relative humidity for 72 hours. Wet foam density was 100 g./liter.

The dithiocarbamate accelerators which were added to separate portions of the base compound above included: a 50% slurry of zinc diethyldithiocarbamate as a control; a 47% aqueous solution of sodium dibutyldithiocarbamate; a 50% aqueous solution of potassium dibutyldithiocarbamate; a 50% aqueous solution of triethylammonium dimethyldithiocarbamate; and a 25% aqueous solution of diethylammonium diethyldithiocarbamate.

Additional samples of foam accelerated with sodium and potassium dibutyldithiocarbamates were gelled with higher proportions of sodium silicofluoride as shown in the following table:

| Dithiocarbamate accelerator | $Na_2SiF_6$ (parts) | Gel time (min.) | Gel quality | Foam quality |
|---|---|---|---|---|
| Zinc diethyldithiocarbamate (Control) | 3 | 8 | Strong | Fine.[1] |
| Sodium dibutyldithiocarbamate | 3 | 21 | Weak | Coarse.[2] |
| Potassium dibutyldithiocarbamate | 3 | 17.5 | ___do____ | Do.[2] |
| Sodium dibutyldithiocarbamate | 4.5 | 15 | ___do____ | Do.[2] |
| Potassium dibutyldithiocarbamate | 4.5 | 13 | ___do____ | Do.[2] |
| Do | 6 | 11 | ___do____ | Do.[2] |
| Triethylammonium dimethyldithiocarbamate | 3 | 8.5 | Strong | Fine.[1] |
| Diethylammonium diethyldithiocarbamate | 3 | 9 | ___do____ | Do.[1] |

[1] Foams fine-celled, reasonably uniform, and satisfactory.
[2] Foams coarse and unsatisfactory.

The rate at which these materials accelerate the cure of the foam was compared by determining the rate of steam cure as measured by compression set. Samples were prepared by placing portions of each sample of frothed latex compound in four separate cylinders 3 inches in diameter and 2 inches deep and curing one for 5 minutes, a second for 10 minutes, a third for 15 minutes and the fourth for 20 minutes in open steam (212° F.). The cure was arrested by immersing the foam in water at 70° F. The foam was removed from the cylinder, washed in water, passed through squeeze rolls, then dried for 72 hours at 73° F. and 50% relative humidity. The test was run according to ASTM D-1055 method (a), and compression set was calculated at percent decrease in height of the foam after compressing it to 50% of its original height for 22 hours at 158° F. and allowing the foam to recover for 30 minutes at 73° F. and 50% relative humidity after removing the weight. The smaller the compression set, the faster the cure. Initial rate of cure is compared best in the 5-minute and 10-minute cures and is important in obtaining cure fast enough to put the foam through the squeeze rolls in production.

Final compression set was determined on the 20-minute cured sample which was dried for 16 hours at 158° F. in a circulating air oven before subjecting it to compression. This is a measure of cure in finished foam as made in industry.

| Dithiocarbamate accelerator | Percent compression set at cures | | | |
|---|---|---|---|---|
| | 5 min. | 10 min. | 15 min. | 20 min. |
| Zinc diethyldithiocarbamate (Control) | 42.0 | 14.6 | 11.8 | 10.9 |
| Diethylammonium diethyldithiocarbamate | 41.0 | 14.0 | 12.5 | 11.2 |

The data in the above two tables show that water-soluble sodium dibutyldithiocarbamate and water-soluble potassium dibutyldithiocarbamate upset the gelatin time of SBR latex foam, giving increased gel time, weak gel, and coarse, nonuniform foam. Use of additional gelling agent did not remedy this defect. Hence they were unsatisfactory. Water-soluble diethylammonium diethyldithiocarbamate, on the other hand, did not upset gelation and gave satisfactory foam. Moreover, its cure rate in SBR latex is the same as that of the water-insoluble zinc diethyldithiocarbamate control used in equal concentration of active material, 1 part per hundred parts of rubber calculated on the dry basis.

EXAMPLE 2

The base formulation of Example 1 was used in the preparation of foams from two different SBR latices: the Pliolite 5352 of Example 1 and Naugatex J-8174 (of Naugatuck Chemical Division of United States Rubber Company, a 68% solids, 76% butadiene–24% styrene copolymer agglomerated by polyvinyl methyl ether and containing soap). Foams containing 1 part each (dry weight basis) of the following dithiocarbamate accelerators were added to separate portions of the base formulation: 50% slurry of zinc diethyldithiocarbamate (as a control), 50% solution of triethylammonium dimethyldithiocarbamate, 50% solution of triethanolammonium dimethyldithiocarbamate and a 50% solution of a 50/50 blend of triethylammonium dimethyldithiocarbamate and triethylammonium dibutyldithiocarbamate. Sodium silicofluoride was used at 2.5 parts (dry basis). The foam was whipped for 4 minutes at speed 3, one minute at speed 2, one minute more at speed 2 after addition of zinc oxide, then 45 seconds at speed 2 after addition of gelling agent, and 15 seconds more at speed 1, or for a total of 7 minutes. Temperatures were 73° F. throughout. Wet foam density was 120 g./liter. The foam was cured in a 1.5 inch slab in open steam at 212° F. for 20 minutes, then dried overnight in a circulating air oven at 158° F.

Compression modulus, expressed in pounds per square inch, was determined on cured foam samples according to the indentation test of ASTM D-1055-59T modified by use of a right cylindrical sample 1.5 inches in diameter and a foot 2.88 inches in diameter. A 16-gram preload was applied which corresponds to the one pound per 50 square inches of the ASTM test. The readings were taken 30 seconds after the load was applied. The tests were performed at 73° F. and 50% relative humidity. Compression modulus is a measure of the load-carrying capacity of foam, and it must be maintained as high as that of zinc diethyldithiocarbamate accelerated foams of the same density to be commercially satisfactory.

The results of the various tests are summarized below:

| Dithiocarbamate accelerator | Gel time (min.) | Foam density (lb./ft.³) | Compression modulus (lb./in.²) | Final compression set (percent) | Percent compression set at cures | | | |
|---|---|---|---|---|---|---|---|---|
| | | | | | 5 min. | 10 min. | 15 min. | 20 min. |
| Naugatex J-8174 latex foams: | | | | | | | | |
| Zinc diethyldithiocarbamate (Control) | 8 | 6.8 | .66 | 4.8 | 49.5 | 17.2 | 10.8 | 9.4 |
| Triethylammonium dimethyldithiocarbamate | 10 | 6.7 | .66 | 4.8 | 32.4 | 11.0 | 8.3 | 7.8 |
| Triethanolammonium dimethyldithiocarbamate | 9 | 6.0 | .40 | 5.5 | 35.0 | 13.7 | 11.9 | 10.1 |
| 50/50 blend: Triethylammonium dimethyldithiocarbamate/triethylammonium dibutyldithiocarbamate | 8.5 | 6.6 | .64 | 4.7 | 18.7 | 14.3 | 10.3 | 8.6 |
| Pliolite 5352 latex foams: | | | | | | | | |
| Zinc diethyldithiocarbamate (Control) | 7.5 | 7.0 | .71 | 5.9 | 42 | 14.6 | 11.8 | 10.9 |
| Triethylammonium dimethyldithiocarbamate | 8.5 | 7.7 | .96 | 5.5 | 27.4 | 12.3 | 11.7 | 10.7 |
| Triethanolammonium dimethyldithiocarbamate | 9 | 6.8 | .57 | 6.0 | 32 | 14 | 12.6 | 12.3 |
| 50/50 blend: Triethylammonium dimethyldithiocarbamate/triethylammonium dibutyldithiocarbamate | 8 | 7.5 | .81 | 5.8 | 14.9 | 12 | 11 | 9.4 |

All three of the water-soluble dithiocarbamate accelerators cured faster than the water-insoluble zinc diethyldithiocarbamate control in both latices as shown by the lower percent compression set values, the order being: 50/50 blend>triethylammonium dimethyldithiocarbamate >triethanolammonium dimethyldithiocarbamate>zinc diethyldithiocarbamate. Although the cure rate of the triethanolammonium dimethyldithiocarbamate at the 5- and 10-minute intervals is satisfactory, its low compression modulus shows that this foam would not be satisfactory from a commercial point of view.

EXAMPLE 3

The following accelerators were substituted in the base foam formulation of Example 1: zinc diethyldithiocarbamate (as a control), trimethylammonium dimethyldithiocarbamate, triethylammonium dimethyldithiocarbamate and three different blends of these, namely a mechanical blend of 50 parts by weight of a 40% solution of trimethylammonium dimethyldithiocarbamate and 50 parts of a 60% solution of triethylammonium dimethyldithiocarbamate (Blend A); a blend of triethylammonium and trimethylammonium dimethyldithiocarbamates prepared by synthesis from a 50/50 mixture of the corresponding tertiary amines (Blend B); and a mechanical blend of

| Dithiocarbamate accelerator | Gel time (min.) | Foam density (lb./ft.³) | Compression modulus (lb./in.²) | Final compression set (percent) | Percent compression set at cures | | | |
|---|---|---|---|---|---|---|---|---|
| | | | | | 5 min. | 10 min. | 15 min. | 20 min. |
| Zinc diethyldithiocarbamate (Control) | 7 | 7.2 | .748 | 7.2 | 43.5 | 12.5 | 10.5 | 8.8 |
| Trimethylammonium dimethyldithiocarbamate | 9.5 | 7.5 | .798 | 7.6 | 35.5 | 10.3 | 8.5 | 7.7 |
| Triethylammonium dimethyldithiocarbamate | 8 | 7.3 | .711 | 7.4 | 39.7 | 11.7 | 9.7 | 8.5 |
| Blend A | 8.75 | 7.4 | .773 | 6.9 | 38.8 | 11.4 | 9.2 | 8.1 |
| Blend B | 8 | 7.2 | .748 | 7.3 | 28.8 | 9.9 | 8.8 | 7.8 |
| Blend C | 8.85 | 7.2 | .723 | 7.4 | 41.0 | 11.7 | 9.1 | 8.2 |

50 parts of a 50% solution of trimethylammonium dimethyldithiocarbamate blended hot, because this dithiocarbamate is only 40% soluble in water at room temperature, with 50 parts of 50% triethylammonium dimethyldithiocarbamate (Blend C). Total whipping time was 8.5 minutes: 6 minutes initial whip at speed 2 and 0.5 minute at speed 3; after addition of zinc oxide, 1 minute at speed 2; after addition of gelling agent (sodium silicofluoride), 0.5 minute at speed 2 and 0.5 minute at speed 1. Wet foam density was 110 g./liter. The results are summarized below:

| Dithiocarbamate accelerator | Gel time (min.) | Foam density (lb./ft.$^3$) | Compression modulus (lb./in.$^2$) | Final compression set (percent) | Percent compression set at cures | | | |
|---|---|---|---|---|---|---|---|---|
| | | | | | 5 min. | 10 min. | 15 min. | 20 min. |
| Zinc diethyldithiocarbamate (Control) | 6.5 | 7.3 | .748 | 7.0 | 45.5 | 15.3 | 12.6 | 11.1 |
| Methylammonium methyldithiocarbamate | 7 | (*) | (*) | (*) | (*) | (*) | (*) | (*) |
| Trimethylammonium diethanoldithiocarbamate | 7 | (*) | (*) | (*) | (*) | (*) | (*) | (*) |
| Trimethylammonium diethyldithiocarbamate | 6.5 | 7.3 | .683 | 7.3 | 47.0 | 19.1 | 13.1 | 11.6 |

*No recovery after passing through squeeze rolls.

was 8.5 minutes: 6 minutes initial whip at speed 2 and 0.5 minute at speed 3; addition of zinc oxide was followed by 1 minute at speed 2; and addition of gelling agent (sodium silicofluoride) was followed by 0.25 minute at speed 2 and 0.75 minute at speed 1. The control was accelerated by 1 part of zinc diethyldithiocarbamate. Wet foam density was 110 g./liter.

Listed in decreasing order of rate of cure, the accelerators used in this example are ranked as follows: (1) blend of 50/50 weight percent of triethylammonium and trimethylammonium dimethyldithiocarbamates prepared from a mixture of the corresponding tertiary amines; (2) trimethylammonium dimethyldithiocarbamate; (3) mechanical blend of equal parts by weight of a 40% solution of trimethylammonium dimethyldithiocarbamate and a 60% aqueous solution of triethylammonium dimethyldithiocarbamate; (4) triethylammonium dimethyldithiocarbamate; and (5) mechanical blend of equal parts of 50% aqueous solution of trimethylammonium dimethyldithiocarbamate and 50% aqueous solution of triethylammonium dimethyldithiocarbamate. Thus it is shown that a blend of triethyl- and trimethylammonium dimethyldithiocarbamates synthesized from a 50/50 mixture of the corresponding tertiary amines is a faster curing accelerator than either of these trialkylammonium dimethyldithiocarbamates alone.

EXAMPLE 4

The following dithiocarbamates were used at 1 part (on the dry basis) in the base SBR latex formulation of Example 1: 50% slurry of zinc diethyldithiocarbamate (as a control); 40% aqueous solution of methylammonium methyldithiocarbamate; 50% aqueous solution of trimethylammonium diethanoldithiocarbamate; and 50% aqueous solution of trimethylammonium diethyldithiocarbamate. Total whipping time was 8.5 minutes: 6 minutes at speed 2 and 0.5 minute at speed 3; after addition of zinc oxide, 1 minute at speed 2; after addition of gelling agent (sodium silicofluoride), 0.5 minute at speed 2 and 0.5 minute at speed 1. Wet foam density was 110 g./liter. The results are summarized below:

These data show that monomethylammonium monoethyldithiocarbamate and trimethylammonium diethanoldithiocarbamate do not function as vulcanization accelerators, whereas trimethylammonium diethyldithiocarbamate does do so.

EXAMPLE 5

Pliolite 5352 foams were made using the base formulation of Example 1 and the mixing conditions of Example 4 but omitting the zinc 2-mercaptobenzothiazole accelerator and using instead increased quantities of the 50/50 blend of triethyl- and trimethylammonium dimethyldithiocarbamates (Blend B). In a control test, 1 part zinc diethyldithiocarbamate was used with 1 part zinc 2-mercaptobenzothiazole (on the dry basis). The results are summarized below:

| Dithiocarbamate accelerator | Zinc 2-mercaptobenzo-thiazole (parts) | Gel time (min.) | Final compression set (percent) | Percent compression set at cures | | | |
|---|---|---|---|---|---|---|---|
| | | | | 5 min. | 10 min. | 15 min. | 20 min. |
| Zinc diethyldithiocarbamate (Control) | 1 | 6.5 | 7.0 | 45.5 | 15.3 | 12.6 | 11.1 |
| Blend B: | | | | | | | |
| 2 parts | 0 | 8 | 9.4 | 51.5 | 49.0 | 46.0 | 38.5 |
| 2.5 parts | 0 | 9 | 8.9 | 51.1 | 48.4 | 43.5 | 27.0 |

These data show that the blend of equal parts of triethyl- and trimethylammonium dimethyldithiocarbamate used at 2 and 2.5 parts per hundred parts of SBR rubber (all on the dry basis) is active in accelerating vulcanization in the absence of zinc 2-mercaptobenzothiazole accelerator though under the conditions used the rate and state of cure are lower.

EXAMPLE 6

The preferred blend (Blend B) of soluble dithiocarbamate accelerators, namely the 50/50 blend of trimethyl- and triethylammonium dimethyldithiocarbamates, was used in combination with zinc 2-mercaptobenzothiazole (Zetax) in foams prepared from a natural (Hevea) rubber latex of 60% solids, a nitrile rubber latex of 66% solids (Polysar XPRD-845, a large particle size, 80% butadiene-20% acrylonitrile copolymer of Polymer Corporation Ltd.), and a 50/50 blend of natural rubber latex with an SBR latex of 69% solids (Pliolite 5352, a large particle size latex of 70% butadiene-30% styrene copolymer of Goodyear Chemical Division). With each foam, the soluble dithiocarbamate accelerator blend was compared with a similar formulation containing an equal amount of zinc diethyldithiocarbamate (Ethyl Zimate) as a control. The formulations were made as follows:

*Foam rubber formulations*

| Latex | Natural | Nitrile | 50/50 natural-SBR blend |
|---|---|---|---|
| Compounding agent (parts per hundred of rubber, calculated on dry basis): | | | |
| 20% potassium oleate soap | [1] 2 | 0 | 1 |
| 50% sulfur dispersion | [2] 2 | 2 | 2 |
| 50% dithiocarbamate accelerator | [3] 1 | 1 | 1 |
| 65% Zetax dispersion | 1 | 1 | 1 |
| 50% Trimene base solution | 1 | 1 | 1 |
| 65% Agerite Spar Emulsion (a commercial antioxidant comprising styrenated phenols) | 1 | | |
| 45% Agerite Stalite Emulsion (a commercial antioxidant comprising octylated diphenylamines) | | 1 | |
| 65% Agerite Superlite Emulsion (a commercial antioxidant comprising polybutylated derivatives of bisphenol A) | | | 1 |
| After 6 minutes' whipping at speed 2; 60% zinc oxide dispersion | 5 | 5 | 5 |
| After 1 minute's whipping at speed 2; 30% sodium silicofluoride dispersion | 2 | 4 | 3 |
| Followed by whipping 0.5 minute each at speeds 2 and 1 | | | |

[1] One part added before maturing overnight and 1 part after maturing.
[2] 0.5 part added before maturing and 1.5 part afterward.
[3] 0.75 part added before maturing and 0.25 part afterward.

Gel time and curing properties of these foams were determined, as follows:

*Properties of latex foams*

| Latex | Natural | | Nitrile | | 50/50 natural-SBR blend | |
|---|---|---|---|---|---|---|
| Accelerator, 1 part. | Ethyl Zimate | Blend B | Ethyl Zimate | Blend B | Ethyl Zimate | Blend B |
| Gel time, min. at 73° F | 4 | 5.5 | 7 | 8.5 | 5 | 6 |
| Compression set after cures: | | | | | | |
| 5 min | ([1]) | ([1]) | 24.0 | 22.0 | 42 | 40.7 |
| 10 min | 33.3 | 36.5 | 14.9 | 11.9 | 14.2 | 14.4 |
| 15 min | 14.9 | 19.0 | 11.4 | 10.4 | 12.2 | 11.0 |
| 20 min | 11.0 | 10.4 | 10.7 | 9.3 | 11.2 | 9.8 |
| Final compression set | 4.5 | 5.0 | 3.5 | 3.5 | 7.0 | 6.5 |

[1] No recovery.

These data show that the water-soluble dithiocarbamates of this invention function satisfactorily as accelerators in foams made from natural (Hevea) rubber latex, butadiene-acrylonitrile latex and in blends of natural and butadiene-styrene (SBR) latices. Examples 1 through 4 have shown that they also function satisfactorily in an all SBR latex foam.

What is claimed is:

1. A process for accelerating the vulcanization of a foam rubber latex without upsetting the gelation thereof which comprises forming a mix consisting essentially of a vulcanizable foam rubber latex selected from the group consisting of natural rubber, styrene-butadiene rubber, and acrylonitrile-butadiene rubber latices and blends thereof and from about 1 part to about 2.5 parts per 100 parts of rubber on a dry weight basis of at least one water-soluble vulcanization accelerator having the formula

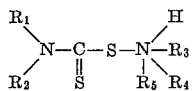

where $R_1$, $R_2$, $R_3$ and $R_4$ are normal alkyl radicals having from one to four carbon atoms and $R_5$ is a radical selected from the group consisting of hydrogen and normal alkyl radicals having from one to four carbon atoms; frothing; gelling for from about 6 to about 10 minutes at about 73° F.; and curing the mix.

2. The process as set forth in claim 1 wherein the water-soluble vulcanization accelerator is diethylammonium diethyldithiocarbamate.

3. The process as set forth in claim 1 wherein the water-soluble vulcanization accelerator is triethylammonium dimethyldithiocarbamate.

4. The process as set forth in claim 1 wherein the water-soluble vulcanization accelerator is trimethylammonium dimethyldithiocarbamate.

5. The process as set forth in claim 1 wherein the water-soluble vulcanization accelerator is triethylammonium dibutyldithiocarbamate.

6. The process as set forth in claim 1 wherein the water-soluble vulcanization accelerator is trimethylammonium diethyldithiocarbamate.

7. The process as set forth in claim 1 wherein the water-soluble vulcanization accelerator is a blend of triethylammonium dimethyldithiocarbamate and triethylammonium dibutyldithiocarbamate.

8. The process as set forth in claim 1 wherein the water-soluble vulcanization accelerator is a blend of trimethylammonium dimethyldithiocarbamate and triethylammonium dimethyldithiocarbamate.

9. The process as set forth in claim 1 wherein the vulcanizable foam rubber latex contains zinc 2-mercaptobenzothiazole.

10. The process as set forth in claim 1 wherein the vulcanizable foam rubber latex contains zinc 2-mercaptobenzothiazole and further wherein the water-soluble vulcanization accelerator is a blend of trimethylammonium dimethyldithiocarbamate and triethylammonium dimethyldithiocarbamate.

References Cited by the Examiner

UNITED STATES PATENTS 2,617,840  11/52  Eckert _____ 260—2.5
2,718,536  9/55   Jones _____ 260—793

MURRAY TILLMAN, *Primary Examiner.*
LEON J. BERCOVITZ, *Examiner.*